(12) United States Patent
Ellison

(10) Patent No.: US 8,408,655 B2
(45) Date of Patent: Apr. 2, 2013

(54) VEHICLE SEAT ASSEMBLY

(75) Inventor: Terrie Ellison, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 12/870,080

(22) Filed: Aug. 27, 2010

(65) Prior Publication Data
US 2012/0049603 A1    Mar. 1, 2012

(51) Int. Cl.
*A47C 7/02*    (2006.01)
*B60N 2/42*    (2006.01)

(52) U.S. Cl. ............ 297/452.18; 297/284.11; 297/216.1

(58) Field of Classification Search ............ 297/452.18, 297/452.27, 284.11, 216.1
See application file for complete search history.

(56) References Cited

U.S. PATENT DOCUMENTS

| | | |
|---|---|---|
| 2,789,621 A | 4/1957 | Langtry et al. |
| 3,161,436 A | 12/1964 | Hood |
| 3,612,607 A | 10/1971 | Lohr |
| 3,853,352 A | 12/1974 | Ambrose |
| 3,915,493 A | 10/1975 | Brown |
| 4,236,751 A | 12/1980 | Strien |
| 4,521,057 A | 6/1985 | Varterasian et al. |
| 4,583,781 A | 4/1986 | Hatsutta et al. |
| 4,583,782 A | 4/1986 | Mikuniya |
| 4,623,192 A | 11/1986 | Koide et al. |
| 4,726,086 A | 2/1988 | McEvoy |
| 4,837,881 A | 6/1989 | Kondo et al. |
| 4,854,643 A | 8/1989 | Cojocari et al. |
| 4,916,765 A | 4/1990 | Castronovo, Jr. |
| 4,930,171 A | 6/1990 | Frantz |
| 5,100,204 A | 3/1992 | Makihara et al. |
| 5,189,747 A | 3/1993 | Mundy et al. |
| 5,368,368 A | 11/1994 | Fukui et al. |
| 5,400,490 A | 3/1995 | Burchi |
| 5,474,362 A | 12/1995 | Albecker, III |
| 5,542,747 A | 8/1996 | Burchi |
| 5,564,144 A | 10/1996 | Weingartner et al. |
| 5,850,645 A | 12/1998 | Ogawa et al. |
| 6,226,819 B1 | 5/2001 | Ogawa et al. |
| 6,481,801 B1 | 11/2002 | Schmale |
| 6,511,562 B1 | 1/2003 | Coffield |
| 6,571,411 B1 | 6/2003 | Ebe |
| 6,625,830 B2 | 9/2003 | Lampel |
| 6,652,034 B1 * | 11/2003 | Schramm et al. ........ 297/452.35 |

(Continued)

FOREIGN PATENT DOCUMENTS

EP    2123507    11/2009
FR    2795371    9/2001

OTHER PUBLICATIONS

International Search Report and Written Opinion of PCT/US2011/027245 dated May 9, 2011.

(Continued)

*Primary Examiner* — Sarah B McPartlin
(74) *Attorney, Agent, or Firm* — Rankin Hill & Clark LLP

(57) ABSTRACT

A vehicle seat assembly includes a seatback and a seat base extending forward from a lower end of the seatback. The seat base is formed of a first foam member extending laterally across the seat base to absorb loads and a second foam member formed over the first member to form a seating surface of the seat base. The first foam member is formed of complementary portions that mate together to form the first foam member.

25 Claims, 5 Drawing Sheets

U.S. PATENT DOCUMENTS

| | | |
|---|---|---|
| 6,663,178 B2 | 12/2003 | Fourrey et al. |
| 6,755,475 B1 | 6/2004 | Tiesler et al. |
| 6,786,541 B2 | 9/2004 | Haupt et al. |
| 6,854,806 B2 | 2/2005 | Huse |
| 7,008,013 B2 | 3/2006 | Okamoto |
| 8,141,957 B2 | 3/2012 | McClung et al. |
| 2004/0245837 A1 | 12/2004 | Clifford |
| 2005/0140199 A1 | 6/2005 | Kang et al. |
| 2006/0001307 A1 | 1/2006 | Embach |
| 2007/0096534 A1 | 5/2007 | Davidson |
| 2008/0042482 A1 | 2/2008 | Weiss et al. |
| 2009/0066142 A1 | 3/2009 | Ventura et al. |
| 2009/0085384 A1 | 4/2009 | Galbreath et al. |
| 2009/0146472 A1 | 6/2009 | Galbreath et al. |

OTHER PUBLICATIONS

Office Action of U.S. Appl. No. 12/722,375 dated Jun. 12, 2012.
Office Action of U.S. Appl. No. 12/722,360 dated Apr. 13, 2012.
U.S. Appl. No. 12/722,375, filed Mar. 11, 2010 and entitled "Vehicle Seat Assembly".
U.S. Appl. No. 12/870,109, filed Aug. 27, 2010 and entitled "Vehicle Seat Assembly".
U.S. Appl. No. 12/722,360, filed Mar. 11, 2010 and entitled "Vehicle Seat Assembly".
Office Action of U.S. Appl. No. 12/722,360 dated Sep. 11, 2012.
Office Action of U.S. Appl. No. 12/870,109 dated Oct. 1, 2012.

* cited by examiner

VEHICLE SEAT ASSEMBLY

BACKGROUND

The present disclosure generally relates to a vehicle seat assembly, and more particularly relates to a seat cushion having a rigid member anchored to a vehicle body.

Vehicle seat assemblies typically include a seat cushion fixed to a vehicle body and a seat back extending upwardly from a rearward portion of the seat cushion. In one conventional anti-submarine construction, a forward edge of the seat cushion is raised relative to the rearward edge. For example, a cross member can be provided under the forward edge to elevate it relative to a vehicle floor and the rearward edge of the seat cushion can be mounted directly to the vehicle floor. In this arrangement, the cross member, which can be formed of sheet metal, can absorb submarine loads imparted to the seat cushion during a vehicle collision event.

The seat cushion can comprise a wire frame and a foam member molded over the wire frame. It can be the wire frame of the seat cushion that is connected to the forward cross member. A rear portion of the wire frame of the seat cushion can be bolted or otherwise secured to the vehicle's floor panel or brackets mounted to the floor panel.

Some vehicle manufacturers employ an expanded polypropylene (EPP) foam member in their vehicle seat cushions. However, such seat assemblies often suffer in comfort. This is particularly a problem when minimal space is available between the rear end of the seat cushion and the vehicle body (e.g., the floor panel).

SUMMARY

According to one aspect, an example of a seat assembly that can overcome the aforementioned shortcomings includes a seatback and a seat base extending forward from a lower end of the seatback. The seat base is formed of a first foam member extending laterally across the seat base to absorb loads and a second foam member formed over the first member and extending rearwardly therefrom to form a seating surface of the seat base. The first foam member is formed of complementary portions that mate together to form the first foam member.

In another example, a seat cushion for a seat assembly in a vehicle includes a first foam member having a longitudinal length extending laterally across the seat assembly and a second foam member molded over the first foam member and extending longitudinally rearward therefrom to form a seating surface. The first foam member is formed of first and second complementary molded halves that meet together along a parting line.

In a further example, a method of constructing a seat cushion for a vehicle seat assembly is provided. In the method according to this example, a first foam member having complementary portions is molded of a first relatively rigid foam material. The complementary portions are secured together along a parting line. The first foam member is overmolded with a second foam member. The second foam member forms a seating surface extending approximately orthogonally from the first foam member relative to a longitudinal length of the first foam member.

DETAILED DESCRIPTION

Figure 1:
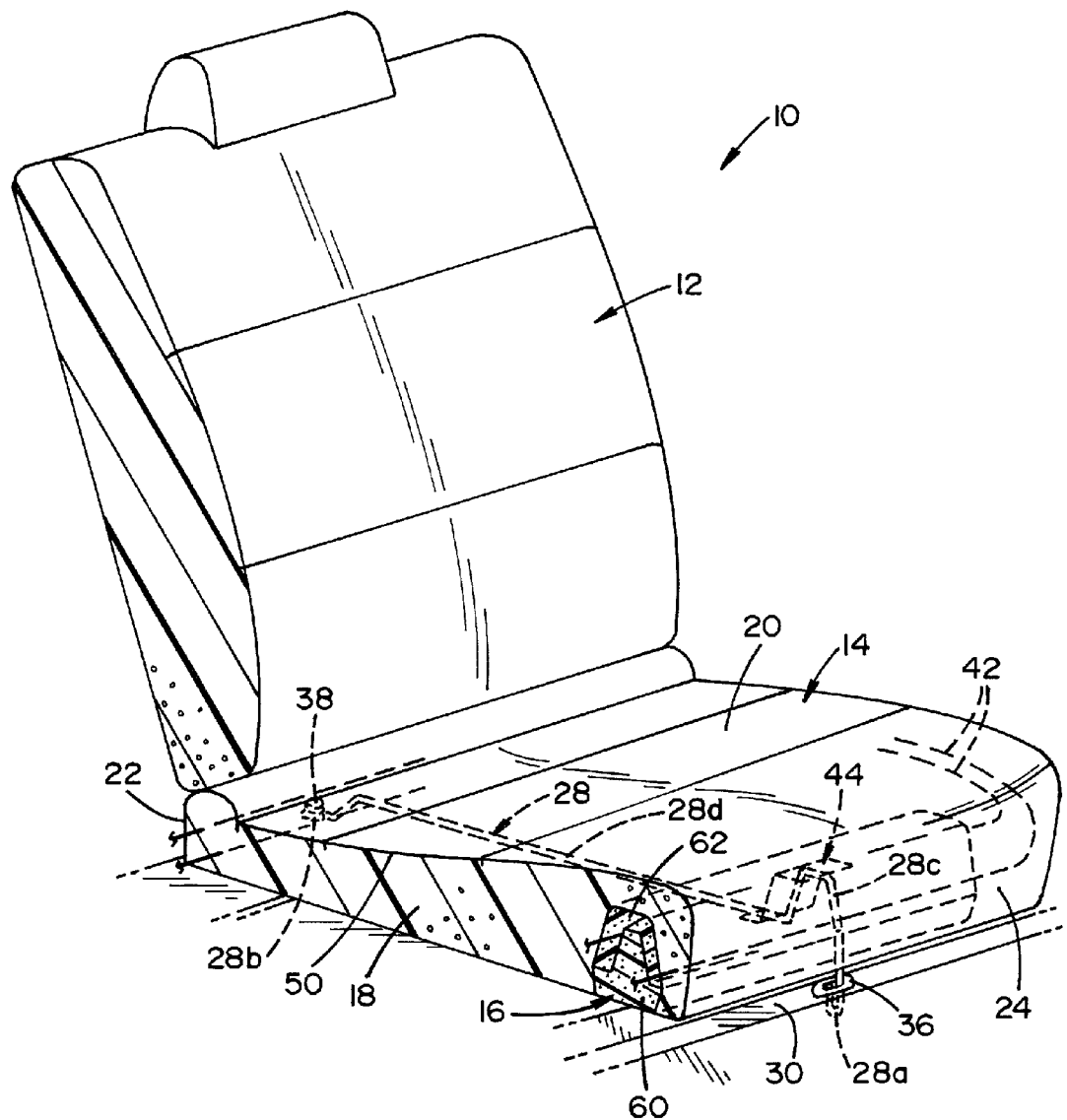
FIG. 1 is a perspective cross-sectional view of a vehicle seat assembly having a first foam member extending laterally across a seat base and a second foam member formed over the first foam member.
Figure 2:
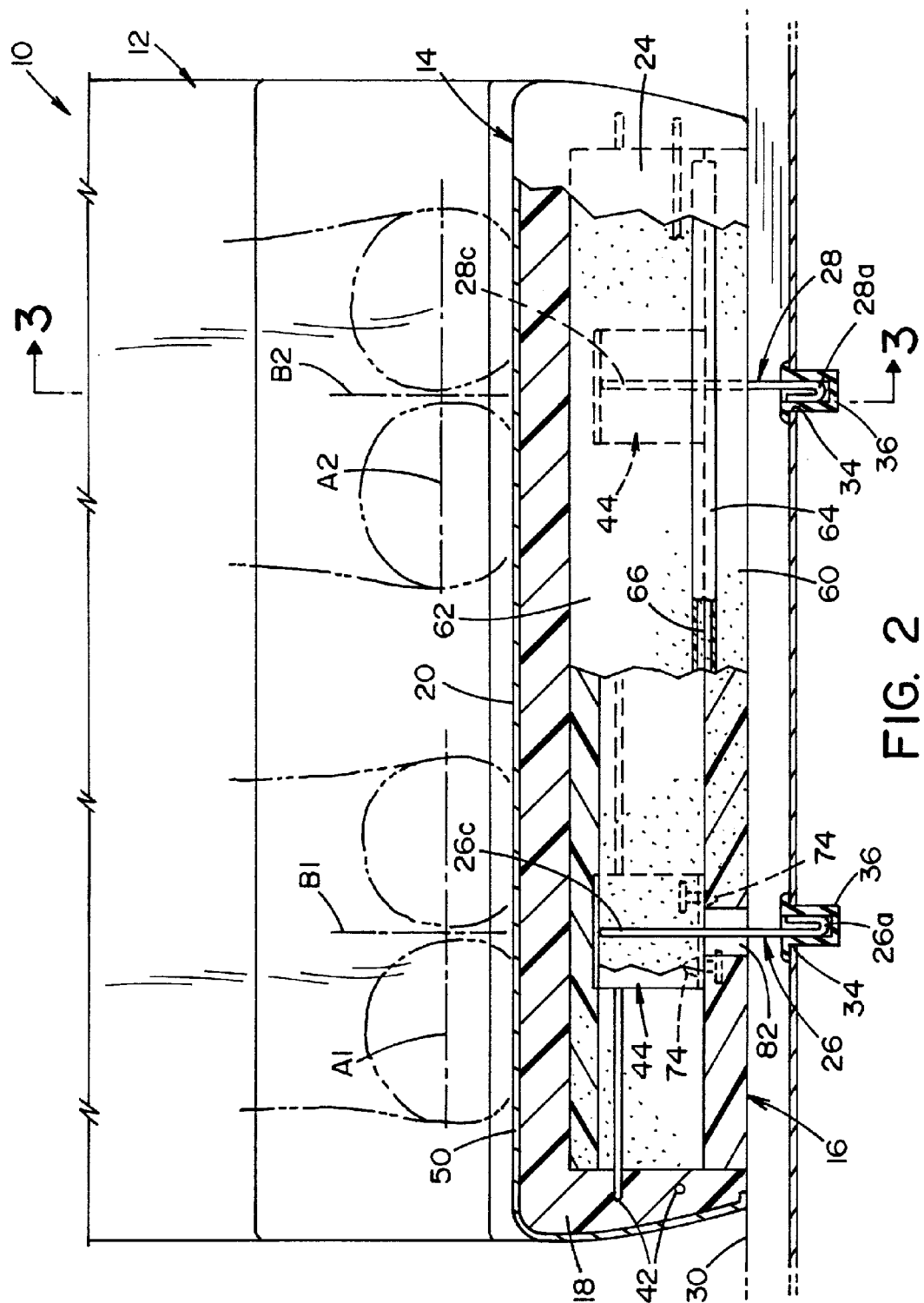
FIG. 2 is a front elevational view, partially in cross-section, of the vehicle seat assembly.

Referring now to the drawing, wherein the showings are purposes of illustrating one or more exemplary embodiments and not for purposes of limiting same. FIG. 1 shows a vehicle seat assembly 10 including a seatback 12 and a seat base 14 extended from a lower end of the seatback 12. The seat base 14, which can also be referred to as a seat cushion, includes and is formed of a first portion or member 16 extending laterally across the seat base 14 to absorb loads (e.g., submarine loads) and a second portion or member 18 formed over the first member 16 to form a seating surface 20 of the seat base 14. In particular, the second member 18 extends longitudinally rearward from the first member 16 to form the seating surface 20. A trim cover 50 can be received over the first and second members 16, 18, particularly over the second member 18, which is itself received over the first member 16.

In one embodiment, the first member 16 is formed of a relatively rigid material, such as rigid foam, and the second member 18 if formed of a relatively less rigid material, such as a soft or less rigid foam. For example, the relatively rigid material of the first member 16 can be expanded polypropylene (EPP) foam and the relatively less rigid material of the second member 18 can be urethane foam. Providing the first member 16, which is formed of a more rigid material (e.g., EPP foam) along a forward portion 24 of the seat base 14 allows the first member 16 to absorb submarine loads and/or child restraint fixture loads, such as might be generated during a vehicle crash event. Providing the first member 16 only locally adjacent to the forward portion 24 allows comfort of the seat base 14 to be maintained through use of the second member 18 being formed of a less rigid material (e.g., urethane foam), while managing loads developed during a crash event.

Figure 3:
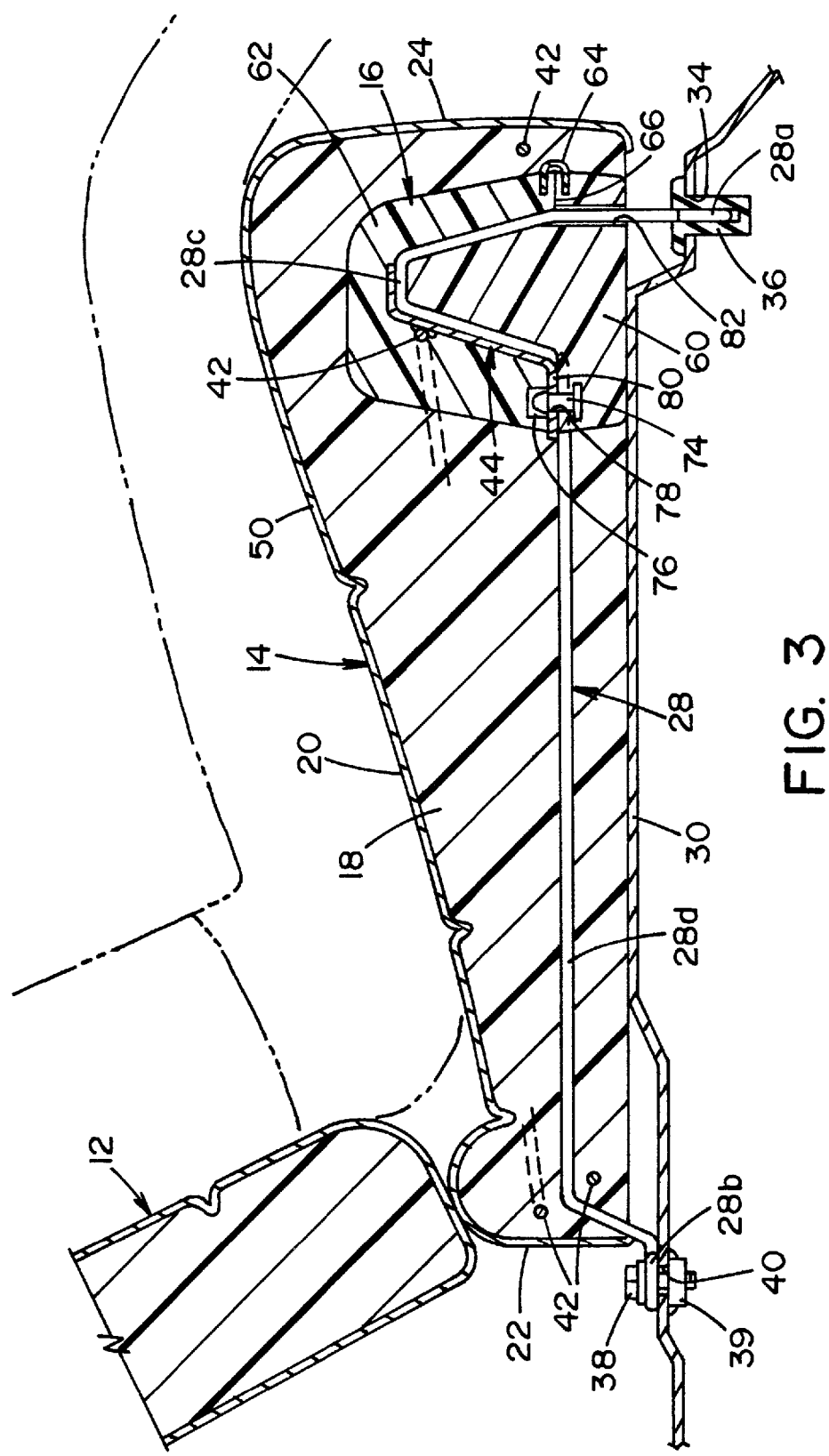
FIG. 3 is a cross-sectional view of the vehicle seat assembly taken along the line 3-3 of FIG. 2.

As shown in the illustrated embodiment, the first foam member 16 can be an elongated member having a longitudinal length extending laterally across the seat base 14. In particular, the longitudinal length of the first member 16 can correspond closely to a lateral width of the seat base 14, though the first member 16 is slightly shorter. A width of the first member 16, by contrast, can be significantly smaller. For example, as best shown in FIG. 3, the width can be less than fifty percent of the front-to-back dimension of the seat base 14, preferably less than thirty percent of the front-to-back dimension, and more preferably approximately twenty-five percent of the front-to-back dimension. A height of the first member 16 can be such that it is nominally shorter than the seat base 14 adjacent the forward portion 24 but higher than the seat base 14 adjacent a rear 22 of the seat base 14.

With additional reference to FIGS. 2-5, the vehicle seat assembly 10 further includes at least one wireframe section (e.g., wireframe sections 26 and 28) secured to the first member 16 and extending rearwardly therefrom toward the rear 22 of the seat base 14 for mounting the seat base 14 to an associated vehicle body (e.g., floor panel 30). As will be described in more detail below, the at least one wireframe section can be laterally disposed at a B-location, which is located centrally along a hip point axis of the seat base 14. This can assist in transferring submarine loads or other loads (e.g., those of a child restraint fixture) from the first member 16 to the associated vehicle body at a location adjacent the rear 22 of the seat base 14.

In the illustrated embodiment, the at least one wireframe section of the vehicle seat assembly 10 includes a first wireframe section 26 and a second wireframe section 28. Accordingly, a pair of laterally spaced apart wireframe sections 26, 28 are provided in the illustrated embodiment, wherein the wireframe sections 26, 28 are connected to the first member 16 and extend longitudinally therefrom toward the rear 22 of the seat base 14 where the wireframe sections 26, 28 can be secured to the vehicle body component (e.g., floor a panel 30). In the illustrated embodiment, the wireframe sections 26, 28 are each disposed centrally (i.e., at a B-location) along a respective hip point axis of the seat base 14.

More particularly, the first wireframe section 26 can be laterally disposed at a B-location B1 of a first hip point axis A1 of the seat base 14 and the second wireframe section 28 can be laterally disposed at a B-location B2 of a second hip point axis A2 of the seat base 14. As is known and understood by those skilled in the art, each hip point axis of the seat base 14 is located at a vertical location where an expected seat occupants hip would be located (i.e., the pivot point between the torso and upper leg portions of a seat occupants body). As used herein, hip point axis is an axis extending in a direction laterally across the vehicle and each hip point axis has a first lateral end and a second lateral end, the distance between the first and second lateral ends being an approximate width of the expected seat occupant. As used here, B-location is a location disposed centrally along each hip point axis (i.e., located centrally between the first and second lateral ends of each hip point axis).

While the illustrated embodiment includes two wireframe sections 26, 28, it is to be appreciated that the seat base 14 could include only a single wireframe section or could include more than two wireframe sections. For example, for a seat base designed for only one occupant the seat base would have only a single hip point axis with a single B-location or center location defined therealong. Accordingly, only a single wireframe section could be used. In a seat base designed for multiple occupants, the seat base could have a hip point axis located where each occupant is expected to be seated and each hip point axis could have its own B-location or center location. In this arrangement, a wireframe section could be provided at each B-location. Also in the illustrated embodiment, the vehicle body or vehicle body component is illustrated as the floor panel 30; however, it is to be appreciated that the wireframe sections 26, 28 could be secured to some other vehicle body component or to some intermediate component or bracket that is itself secured to the vehicle floor panel 30 or some other vehicle body component.

As shown in the illustrated embodiment, first ends 26a, 28a of the wireframe sections 26, 28 can be secured to the vehicle floor panel 30 adjacent the forward edge 24 of the seat base 14 and second ends 26b, 28b can be secured to the vehicle floor panel 30 adjacent the rearward edge 22 of the seat base 14. Respective portions 26c, 28c can be secured to the first member 16 as will be described in more detail herein below for transferring submarine loads (or other loads, e.g., child restraint device loads) absorbed thereby to the vehicle floor panel 30. In particular, portions 26c, 28c can be formed with an inverted U or V-shape that provides for better interlocking by the first member 16. Extending portions 26d, 28d of the wireframe sections 26, 28 extend from the inverted U-shaped sections 26c, 28c to the rear end 22 of the seat base 14. As best shown in FIG. 3 with respect to rear end 28b, the rear ends 26b, 28b of the wireframe sections 26, 28 can be secured to the vehicle body component or floor panel 30 adjacent the rear end 22 of the seat base 14. Forward ends 26a, 28a can be secured to the vehicle body component (e.g., floor panel 30) or another vehicle body component (e.g., a bracket mounted to the floor panel 30) adjacent the forward end 24 of the seat base 14 below the first member 16 in the illustrated embodiment.

More specifically, in the illustrated embodiment, the floor panel 30 defines receiving apertures 34 in which the forward ends 26a, 28a are received for connecting to the floor panel 30, though this could be another vehicle body component. In particular, grommets 36 can facilitate connection of the forward ends 26a, 28a to the floor panel 30. To facilitate this connection, the forward ends 26a, 28a can include hooked portions as shown in the illustrated embodiment. The rearward ends 26b, 28b of the wireframe sections 26, 28 can be formed as looped portions for receipt of bolts 38. In particular, bolts 38 can be received through looped ends portions 26b, 28b of the wireframe sections 26, 28 and then into apertures 40 defined in the floor panel 30 for securing the wire frame sections 26, 28 to the floor panel 30 (or to another vehicle body component) as best shown with respect to rearward end 28b in FIG. 3. A threaded member, such as nut 39, can be threadedly secured to each of the bolts 38 thereby securing the connection of the wireframe sections 26, 28 to the floor panel 30. Of course, other connection means and devices can be used to secure the rearward ends 26b, 28b to the vehicle body component.

As will be described in more detail below, the first member 16 can be secured onto the wireframe sections 26, 28, particularly onto the inverted U-shaped portions 26c, 28c of the wireframe sections 26, 28. The second member 18 can then be overmolded onto at least one of the first member 16 and the wireframe sections 26, 28. In the illustrated embodiment, the second member 18 is over-molded onto both the first member 16 and the wireframe sections 26, 28 as will be described in further detail below.

If desired, the vehicle seat assembly 10, and particularly the seat base 14 thereof, can include another wireframe section 42, which is also overmolded by the second member 18. In particular, the wireframe section 42 can be provided about a perimeter of the seat cushion or base 14 and provide a structure on which to overmold the second member 18. Additionally, as best shown in FIG. 3, the longitudinally extending wireframe sections 26, 28 can pass through and inter-engage the wireframe 42 adjacent the rear end 22 of the seat base 14.

A plate member 44 can be provided in association with each wireframe section 26, 28. In the illustrated embodiment, each plate member 44 is disposed along a rearward section of the portions 26c, 28c of the wireframe sections 26, 28. The plates 44 function to prevent the wireframe sections 26, 28 from tearing or ripping through the first member 16 during a collision event. In the illustrated embodiment, each plate 44 is secured to the frame 42, such as by welding, though other arrangements are possible. For example, each plate 44 could be welded onto the corresponding wireframe section 26, 28 or otherwise secured in position.

In one known design (not shown), the first member 16 is overmolded onto the wireframe sections 26, 28 for connecting the first member 16 and the wireframe sections 26, 28 together. While this creates a secure connection between the wireframe sections 26, 28 and the first member 16, overmolding the first member 16 onto the wireframe sections 26, 28 can cause deformation of the wireframe sections 26, 28. In particular, as the first member 16 shrinks after such overmolding, particularly when the first member 16 is formed from EPP, the wireframe sections 26, 28 deform from the force of contraction of the first member 16. As a result, the forward ends 26a, 28a of the wireframe sections 26, 28 end up being spaced closer together and the rear ends 26b, 28b of the wireframe sections 26, 28 end up being spaced further apart. This can make installation of the seat base 14 in a vehicle difficult as the forward ends 26a, 28a of the wireframe sections 26, 28 may not line up with the apertures 34 in the floor panel 30 and/or the rear ends 26b, 28b may not line up with the apertures 40 in the floor panel 30. Moreover, predicting the exact amount of shrinkage in the first member 16 and the corresponding amount of deformation at the forward ends 26a, 28a and/or the rear ends 26b, 28b is difficult.

Accordingly, in part to address this problem, the first foam member 16 of the illustrated embodiment is formed of complementary molded portions or halves that mate together along a parting line to form the first foam member 16. In particular, with specific reference to FIG. 4, the first foam member 16 of the illustrated embodiment is formed of first and second complementary molded portions or halves 60, 62 that are connected to one another by an integrally molded or formed hinge 64 and mate together along a parting line 66. Being connected to one another by the integrally molded hinge 64, which can be a living hinge, allows the portions 60, 62 to be molded together as a single molded piece. As already described herein, the first member 16 can be formed of a relatively rigid material and thus the complementary portions 60, 62 can likewise be formed of a relatively rigid material (e.g., EPP).

The complementary portions 60, 62, which include lower portion 60 and upper portion 62 in the illustrated embodiment, mate together around the wireframe sections 26, 28 to secure the first foam member 16 thereto. In particular, in the illustrated embodiment, each of the wireframe sections 26, 28 includes a non-linear section (e.g., portions 26c and 28c) about which the complementary portions 60, 62 are received. In the illustrated embodiment, these non-linear sections are the inverted U-shaped sections 26c, 28c adjacent the forward ends 26a, 28a of the wireframe sections 26, 28. Each of the complementary portions 60, 62 can have a mating surface 60a, 62a that, respectively, conforms to the non-linear sections 26c, 28c of the wireframe sections 26, 28 and to the other of the complementary portions or halves 60, 62 (i.e., mating surface 60a of the lower portion 60 conforms to the non-linear sections 26c, 28c and to the upper portion 62; likewise, the mating surface 62a conforms to the non-linear sections 26c, 28c and to the lower portion 60). This arrangement results in the parting line 66 being non-linear.

Figure 4:
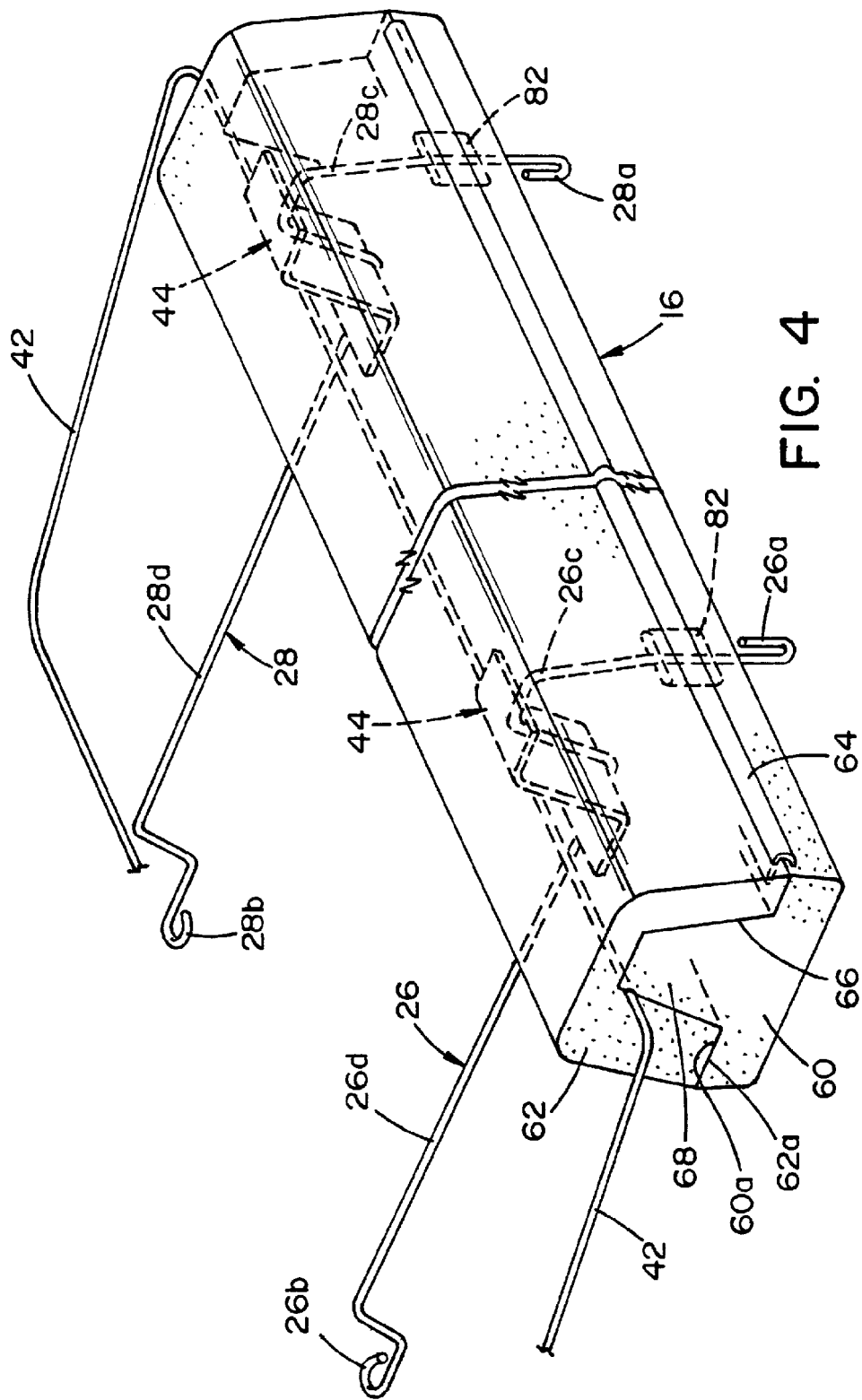
FIG. 4 is a partial perspective view of the seat base shown with the second foam member removed.
Figure 5:
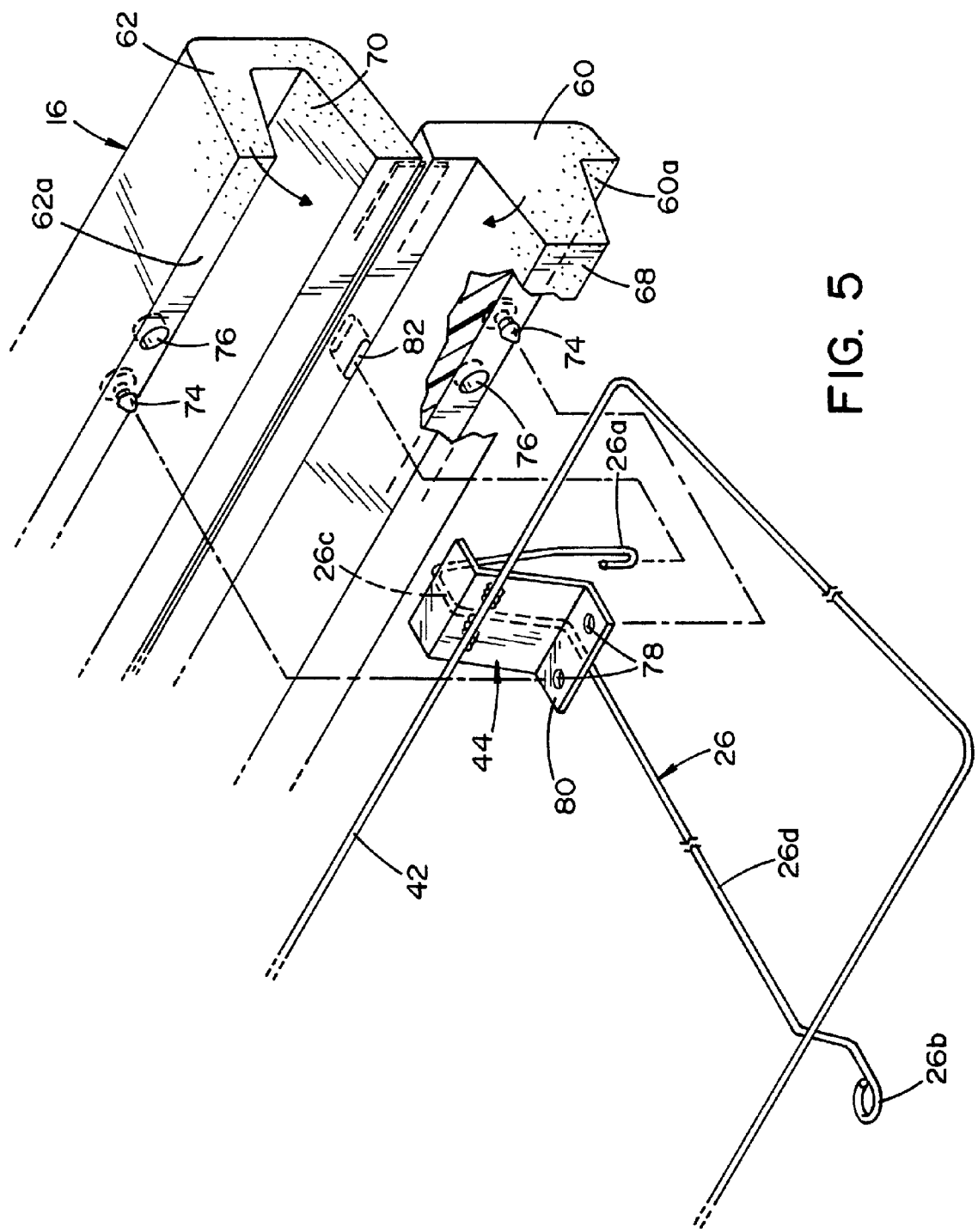
FIG. 5 is a partial perspective view showing complementary portions of the first foam member being closed about an longitudinally extending wireframe section and another wireframe.

More specifically, the lower portion 60 can have a ridge 68 extending upward from mating surface 60a thereof. The upper portion 62 can have a recess 70 defined in mating surface 62a of the upper portion 62 for receiving the ridge 68 when the lower and upper portions are assembled together as shown in FIG. 4. As shown, the ridge 68 can be received in the inverted U-shaped sections 26c, 28c, and in the recess 70 of the upper portion 62, and recess 70 of the upper portion 62 can receive an apex or apex portion of the inverted U-shaped sections 26c, 28c and the ridge 68 of the lower portion 60. The lower portion 60 can also include apertures 82 that allow respective wireframe sections 26, 28 to pass through the lower portion 60 to the floor panel 30.

The complementary portions 60, 62 can include at least one integrally molded connector for locking the molded portions 60, 62 together. In the illustrated embodiment, each of the complementary portions 60, 62 have at least one integrally molded connector 74 for locking the complementary portions 60, 62 together when folded together about the hinge 64. For receipt of the integrally molded connector, at least one of the complementary portions 60, 62 can include a recess 76 formed therein for receiving the at least one integrally molded connector 74. In the illustrated embodiment, each of the molded portions, 60, 62 includes an integrally molded connector 74 and each includes a recess 76 for accommodating the integrally molded connector of the other of the molded portions 60 or 62.

In the illustrated embodiment, the integrally molded connector 74 specifically connects to the plates 44 of each of the wireframe sections 26, 28. Accordingly, the plates 44 are fixed to the respective wireframe sections 26, 28 along respective lengths or portions thereof that have the complementary portions 60, 62 mated therearound. The complementary portion 60, 62 have the integrally molded connector 74 locking the complementary portions 60, 62 to the plates 44. More specifically, each of the plates 44 defines apertures 78 therein and each of the complementary portions 60, 62 has its integrally molded connector 74 received through a corresponding one of the apertures 78 to lock the complementary portions 60, 62 to the plate 44. As shown in the illustrated embodiment, a lower portion 80 of the plate 44 can have two spaced apart apertures 78, one for receiving connector 74 of the lower portion 60 and one for receiving the connector 74 of the upper portion 62. Of course, it should be appreciated by those skilled in the art that other types of connectors and arrangements are possible and should be considered within the scope of the present disclosure.

A method for constructing a vehicle seat assembly, and particularly a seat cushion for a vehicle seat assembly, will now be described, such as the vehicle seat assembly 10 of the illustrated embodiment and its seat cushion 14. First, a first foam member having complementary portions is molded of a first relatively rigid foam material. In the illustrated embodiment, the first foam member 16 has the complementary portions 60, 62 and can be molded of a relatively rigid material, such as EPP foam. Next, the complementary portions are secured together along a parting line. In the illustrated embodiment, the complementary portion 60, 62 are secured to one another along the parting line 66, which can be a non-linear parting line. Next, the first foam member is overmolded with a second foam member. In the illustrated embodiment, the first foam member 16 is overmolded with the second foam member 18. As already described herein, the second foam member 18 forms the seating surface 20 extending approximately orthogonally from the first foam member 16 relative to a longitudinal length of the first foam member 16.

Securing the complementary portions together can include securing the complementary portions to at least one wireframe section extending approximately normal relative to the longitudinal length of the first foam member for transferring loads from the first foam member to a rear of the seat cushion. In the illustrated embodiment, the complementary portion 60, 62 can be secured to the wireframe sections 26, 28 that extend approximately normal relative to the longitudinal length of the first member 16 for transferring loads from the first member 16 to a rear 22 of the seat cushion 14. As already discussed herein, one or both of the complementary portions 60, 62 can be molded with integral connectors, such as connector 74, for interlocking the complementary portions 60, 62 together.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat assembly, comprising:
   a seat back; and
   a seat base extending forward from a lower end of said seat back, said seat base formed of a first foam member extending laterally across said seat base to absorb loads and a second foam member formed over said first member and extending rearwardly therefrom to form a seating surface of said seat base, said first foam member formed of complementary portions that mate together to form said first foam member, wherein said complementary portions include a first portion and a second portion connected to one another by an integrally formed hinge.

2. The vehicle seat assembly of claim 1 wherein said complementary portions are formed of a relatively rigid material and said integrally formed hinge is a living hinge, said second foam member formed of a relatively less rigid material.

3. The vehicle seat assembly of claim 2 wherein said relatively rigid material is expanded polypropylene and said relatively less rigid material is a urethane foam.

4. The vehicle seat base of claim 1 wherein said complementary portions include a lower portion having a ridge extending upward from a mating surface of said lower portion, and an upper portion having a recess defined in a mating surface of said upper portion for receiving said ridge when said lower and upper portions are assembled together.

5. The vehicle seat base of claim 1 wherein said complementary portions are molded together as a single molded piece.

6. A vehicle seat assembly, comprising:
   a seat back; and
   a seat base extending forward from a lower end of said seat back, said seat base formed of a first foam member extending laterally across said seat base to absorb loads and a second foam member formed over said first member and extending rearwardly therefrom to form a seating surface of said seat base, said first foam member formed of complementary portions that mate together to form said first foam member, wherein said first foam member is secured to at least one wire frame section that extends rearwardly from said first foam member toward a rear of said seat base for mounting said seat base to an associated vehicle body, said complementary portions mating together around said at least one wire frame section to secure said first foam member thereto.

7. The vehicle seat assembly of claim 6 further including:
   a plate fixed to said at least one wire frame section along a length thereof that has said complementary portions mated therearound, said complementary portions having at least one integrally molded connector locking said complementary portions to said plate.

8. The vehicle seat assembly of claim 7 wherein said plate defines apertures and each of said complementary portions has at least one integrally molded connector received through a corresponding one of said apertures to lock said complementary portions to said plate.

9. The vehicle seat assembly of claim 6 wherein each of said at least one wire frame section includes a nonlinear section about which said complementary portions are received, each of said complementary portions having a mating surface that conforms to said nonlinear section and the other of said complementary portions.

10. The vehicle seat assembly of claim 9 wherein said nonlinear section is an inverted U-shaped section adjacent a forward end of said at least one wire frame section, a first lower one of said complementary portions having a complementary ridge received in said inverted U-shaped section and a second upper one of said complementary portions having a recess receiving an apex of said inverted U-shaped section and said ridge of said first lower one.

11. The vehicle seat assembly of claim 10 wherein said forward end of said at least one wire frame section is secured to an associated vehicle body under a front end of said seat base, and an extending portion of said at least one wire frame section extends from said inverted U-shaped section to a rear end of said seat base, and a rear end of said at least one wire frame section is secured to said associated vehicle body rearwardly of said seat base.

12. The vehicle seat assembly of claim 6 wherein said seat base has at least one B-location, said at least one wire frame section is laterally disposed at said at least one B-location.

13. The vehicle seat assembly of claim 6 wherein said complementary portions have at least one integrally molded connector for locking said complementary portions together when folded together about said at least one integrally molded connector.

14. The vehicle seat assembly of claim 13 wherein at least one of said complementary portions has said at least one integrally molded connector and at least the other of said complementary portions has a recess formed therein for receiving said at least one integrally molded connector.

15. The vehicle seat base of claim 6 wherein said complementary portions are molded together as a single molded piece.

16. A vehicle seat assembly, comprising:
   a seat back;
   a seat base extending forward from a lower end of said seat back, said seat base formed of a first foam member extending laterally across said seat base to absorb loads and a second foam member formed over said first member and extending rearwardly therefrom to form a seating surface of said seat base, said first foam member formed of complementary portions that mate together to form said first foam member; and
   a wire frame overmolded by said second foam member.

17. The vehicle seat base of claim 16 wherein said complementary portions are molded together as a single molded piece.

18. A seat cushion for a seat assembly in a vehicle, comprising:
   a first foam member having a longitudinal length extending laterally across the seat assembly; and
   a second foam member molded over said first foam member and extending longitudinally rearward therefrom to form a seating surface,
   wherein said first foam member is formed of first and second complementary molded halves that mate together along a parting line, and wherein said complementary molded halves include at least one integrally molded connector for locking said molded halves together.

19. The seat cushion of claim 18 wherein said first and second complementary molded halves are molded together as a single molded piece.

20. The seat cushion of claim 18 wherein said first foam member is formed of a rigid foam and said second foam member is formed of a less rigid foam.

21. The seat cushion of claim 18 wherein said parting line is nonlinear.

22. A method of constructing a seat cushion for a vehicle seat assembly, comprising:

molding a first foam member having complementary portions of a first relatively rigid foam material;

securing said complementary portions together along a parting line, wherein securing said complementary portions together includes securing said complementary portions to at least one wire frame section extending approximately normal relative to said longitudinal length for transferring loads from said first foam member to a rear of the seat cushion; and overmolding said first foam member with a second foam member, said second member forming a seating surface extending approximately orthogonally from said first foam member relative to a longitudinal length of said first foam member.

23. The method of claim 22 wherein said complementary portions are molded together as a single molded piece.

24. A method of constructing a seat cushion for a vehicle seat assembly, comprising:

molding a first foam member having complementary portions of a first relatively rigid foam material;

securing said complementary portions together along a parting line, wherein said one or both of said complementary portions are molded with integral connectors for interlocking said complementary portions together; and overmolding said first foam member with a second foam member, said second member forming a seating surface extending approximately orthogonally from said first foam member relative to a longitudinal length of said first foam member.

25. The method of claim 24 wherein said complementary portions are molded together as a single molded piece.

* * * * *